May 31, 1938.  J. PEARLMAN ET AL  2,118,896

MOTION PICTURE FILM MAGAZINE

Filed Oct. 8, 1935

INVENTORS
Julius Pearlman
Albert Kindelmann
BY
ATTORNEYS

Patented May 31, 1938

2,118,896

UNITED STATES PATENT OFFICE 2,118,896

MOTION-PICTURE FILM MAGAZINE

Julius Pearlman, New York, and Albert Kindelmann, Floral Park, N. Y., assignors to International Projector Corporation, New York, N. Y., a corporation of Delaware Application October 8, 1935, Serial No. 44,016

7 Claims. (Cl. 88—17)

This invention relates to an improved film magazine for use with motion picture cameras, the magazine being adapted to receive motion picture film and enable it to be fed, from one position within the magazine, past a point where successive sections of the film are intermittently, momentarily stopped for exposure, to form the desired series of pictures, and thence to another position also within the magazine.

A feature of the present invention resides in the provision of a magazine of this character including a take-up spool or the like for winding the exposed film continuously, and a take-off spool or the like which is by preference not separately driven, the improved magazine being particularly simple to construct and effective in operation.

Another feature of the present invention lies in a film magazine construction which avoids the need for channels or passageways extending beyond a gate plate employed in order to assist in holding the film flat at the point where exposures are made, and which enables the film to be properly controlled during its passage from the gate plate to the take-up spool.

A more detailed feature of the present invention resides in an improved film magazine provided with means including a resiliently mounted member or roller for assisting in withdrawing from the vicinity of the gate plate, film which has been exposed and which has been fed forward by the action of the intermittent mechanism at a rate more rapid than the rate at which film is wound on the take-up spool.

Still another feature of the present invention resides in the provision of a yielding or resilient member which is attached to the magazine at any suitable point so that the free end of the resilient member bears against the film passing from the gate to the take-up spool and urges this length of film against the film on the take-off spool to assist in preventing the latter from freely unwinding during shipping or handling of the magazine, this resilient member being so arranged that it is released as an incident to rotation of the take-up spool, so that undue friction is avoided. A detail of this construction lies in the arrangement of the take-off spool so that the film unwinding from it and the film passing to the take-up spool move in the same direction. This feature in one of its broad aspects includes the mounting of a resilient member so that it assists in preventing unwinding of the film during shipping and during picture taking it functions to maintain the film sufficiently tensioned to allow proper winding up of the exposed film on the take-up spool.

A further detailed feature of the present invention lies in a construction of the character above mentioned, in which a pin is provided for cooperation with the resilient member to guide the film in a desired or indirect path from the gate to the take-up spool.

Other features, objects and advantages of the present invention will become apparent in connection with the following detailed description of certain forms of magazines embodying and illustrating the invention, reference being had to the accompanying drawing, wherein.

Figure 1:
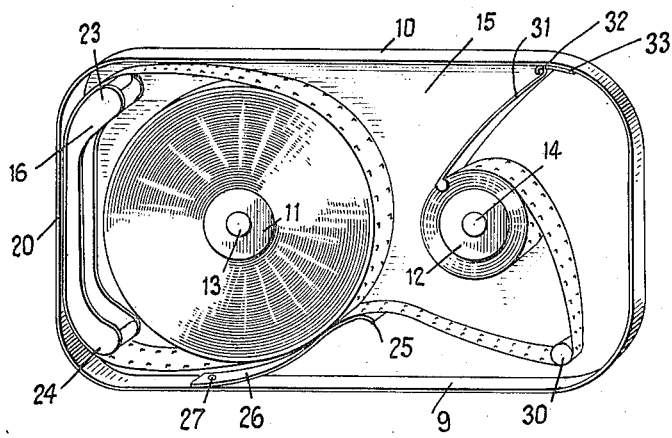
Fig. 1 is a perspective view showing the interior of one form of a magazine constructed in accordance with the present invention.

Referring first to the form illustrated in Fig. 1, there is shown a suitable container 10, with the cover or top wall removed and not illustrated, formed of metal or other suitable material and adapted to receive a film take-off spool 11 and a film take-up or supply spool 12, the former being journalled on a stub shaft 13 fixed to the bottom wall 15 of the container or magazine, and the latter being carried for rotation with spindle 14 which may be journalled in a suitable bearing (not shown) also carried by the bottom wall 15 of the magazine. The spindle 14 may be driven at constant speed through any suitable or known mechanism carried by the camera for cooperation with the spindle. When desired, the spool 11 and stub shaft 13 may be arranged so that there is a slight frictional engagement between them, so that the spool 11 will readily turn when the film is pulled, and on the other hand, so that the slight friction may assist in preventing unwanted rotation of the spool. Moreover, the spool 12 and spindle 14 may be so constructed that while the spool ordinarily rotates with the spindle, it may slip with respect to the spindle when the latter for any reason runs too far ahead of the intermittent feeding mechanism. While the present invention is not restricted to the details through which these spools 11 and 12 are assembled or driven, and while these details may vary in accordance with familiar machine shop practice, reference may be made to our copending application Serial No. 604,162, filed April 9, 1932, now Patent No. 2,022,353 of November 26, 1935 for a particularly satisfactory structure for these purposes. Or the frictional engagement and slip may be provided, as shown by the relative sizes and fit of the shafts or spindles with the interior openings of the spools.

The film from the take-off spool which rotates in a counterclockwise direction in the embodiments shown herein, passes over the curved upper end 23 of a gate plate 16 which may advantageously, though not necessarily, take the general form shown, and which may be bolted to the bottom wall 15 of the magazine. This gate plate is provided as indicated at 17 with a suitable presser plate normally urged forwardly by a spring 18 seated in a recess 19 in the gate plate. The presser plate 17 serves to urge the film which is being exposed into a position where it lies flat across a window or aperture (not shown) formed in the front side or edge wall 20 of the magazine 10 directly in front of the presser plate 17. Suitable recesses 21 and 22 may be formed in the front face of the gate plate 16 for enabling a claw and pin, respectively, or other parts of suitable intermittent mechanism to enter the sprocket holes in the film, for intermittently drawing it rapidly forward and stopping it during each exposure. Advantageous mechanism for this is shown in copending application Serial No. 729,594, filed June 8, 1934, in the name of Albert Kindelmann. As indicated at 23 and 24, the upper and lower ends of the gate plate 16 may be suitably curved so that sharp bends in the film are avoided.

From the lower end of the gate plate 16, the film travels to the take-up spool 12 over the curved, free end 25 of a resilient member 26, the other end of which is preferably fastened to one of the side or edge walls 9 of the casing at any convenient point, for instance, by means of a rivet 27. The flexible member 26 may be composed of metal or other suitable material, constructed and arranged so that the free end 25 constantly tends to flex upwardly to a suitable extent into the space between the spools 11 and 12, for urging the strip of exposed film passing from the gate to the take-up reel, against the outside of a full roll of film on the take-off spool, preferably along a surface located generally between the three o'clock and six o'clock positions of the spool 11 as viewed in Fig. 1. In this manner, the member 26 may be made exceptionally long as is desirable for present purposes, with the fixed end conveniently located, and with the entire member freed of undesired interference with the film in the magazine. That is, the film strip contacts only a relatively small surface near the end of the member 26 and not with any extended portion of its length.

The resilience of the spring 26 is advantageously such that when the take-up spool 12 starts to wind the film, this action will cause the film between portion 24 of the gate and the take-up spool to pull the end 25 down slightly so as to relieve the engagement of this portion of the film and the film on the take-off spool. Furthermore, the resiliently mounted member may be so arranged that it either operates as described during the feeding of the initial portions of the film from the take-off spool, or swings up as the diameter of the film on the spool 11 decreases, as far as desired.

It is to be understood in some instances that the resilient member 26 may be of shorter length and mounted to definitely press against the full roll of film on the take-off spool with only the strip of film from portion 24 of the film gate to the take-up spool between. In such an instance and during the movement of this strip of film the resilient member 26 will be flexed away from the roll of film on the take-off spool as described above.

It will be noted that the film passing from the lower end of the gate plate to the take-up spool is not confined to any particular channel, or passageway, and thus the film runs free without excessive friction, and with the advantage that the spring mechanism and other parts of the film feeding mechanism in the camera may be relatively light.

While the film may pass directly from the end 24 of the gate plate to the take-up spool 12, it may be advantageous to employ a guide post or roller 30, preferably mounted adjacent the lower right-hand corner of the casing 10, to cause the film between the free end of arm 26 and the guide to take an indirect path, so that the film may be wound upon the take-up spool without sharp bends. While the post is preferably located about in the position shown, it may take other positions, and indeed it may be omitted altogether.

In order to assist in effecting a smooth, compact winding of the film on the take-up spool, a suitable arm 31 may be pivoted upon a pin 32 carried by a forked bracket 33 secured as by pivoting or otherwise to the one of the side or edge walls of casing, with a coil spring or other suitable device engaged with the post 32 and urging the arm 31 against the film while it is wound on spool 12. These details, however, may be varied to suit convenient practice.

The operation of the construction will no doubt be understood from the foregoing description, but it may be summarized here. When the take-up spool 12 is continuously rotated at its predetermined speed, with suitable intermittent mechanism alternately pulling the film forward adjacent the film gate, and stopping it for exposure, the resilient device 26 assists in drawing forward exposed film during the time that the film passing through the gate is being rapidly moved by the intermittent mechanism, thus cooperating with the gate plate assembly, which includes the presser member 17, to hold flat each film section or frame while it is exposed at the aperture. Moreover, the resilient member 26, by bearing against the film as described, assists in preventing unwinding of the film on the take-off spool during shipment or handling of the magazine. On the other hand, friction between the film on the take-off spool and the film passing from the gate to the take-up spool is relieved to permit the intermittent mechanism to draw the film off the take-off spool as required, all without the need for separately driving the take-off spool, or other complicated mechanism.

Figure 2:
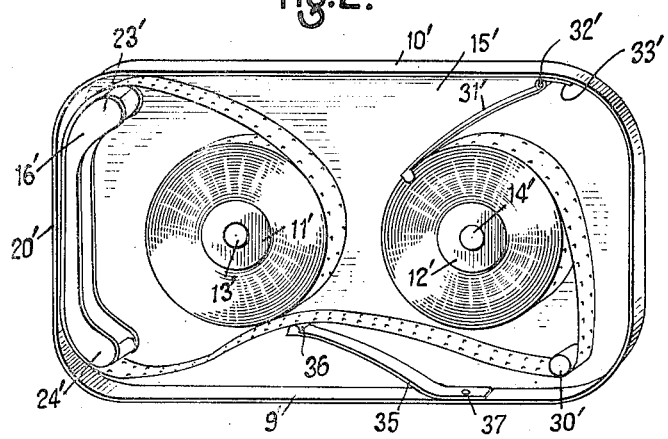
Fig. 2 is a similar view of a modified form of the construction shown in Fig. 1.
Figure 3:
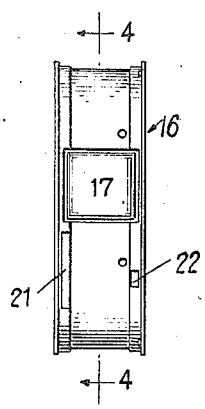
Fig. 3 is a front elevation of a form of gate plate construction employed in the magazine.
Figure 4:
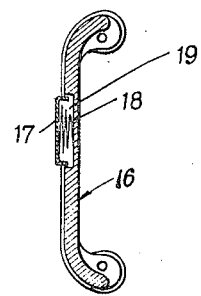
Fig. 4 is a vertical section taken on the line 4—4 of Fig. 3 looking in the direction of the arrows.

Referring now to Fig. 2, wherein like parts are referred to by like numbers, except that in Fig. 2 a prime (') is used with each number, there is shown a somewhat modified construction, which is in most respects similar to the construction shown in Fig. 1, except that, instead of the resilient member 26, there may be provided a similar device 35 having, if desired, a roller 36 mounted in any convenient manner upon its free end, and being secured to the side or edge wall 9 of the magazine, for instance, as shown at 37, this member 35 operating similarly to the resilient member 26 previously described.

It will thus be appreciated that there is provided a simple film magazine which is inexpensive to construct and efficient in operation. Moreover, this magazine avoids the need for a channel or passageway or any extended surface of contact for the film and thus allows more room in a magazine of given size for receiving film, while avoiding undesired friction. In addition, the film on the take-off reel is held sufficiently during shipment of the magazine to prevent unrolling of the outer layers of film, and the exposed film section which bears against the film on the take-off reel is slacked off during the operation of the mechanism to enable a free feeding of the film to the gate. When a guide post or roller is employed in combination with the resilient member or roller or the like, there is provided an improved film path for present purposes, all without occupying excessive space in the magazine. A particular advantage of the present construction lies in the employment of a gate plate of present character in combination with the other features described, whereby the film in the gate is maintained flat and steady during the time when exposures are made.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

We claim:

1. In a motion picture film magazine including a take-off spool, a continuously driven take-up spool and a gate past which the film is intermittently moved from one spool to the other, and a resilient arm urged toward said take-off spool, said arm having a curved end adapted to engage a portion of the film between the gate and the take-up spool to form a bent section therein and urge said portion against film on the take-off spool.

2. In a motion picture film magazine including a take-off spool, a continuously driven take-up spool and a gate past which the film is intermittently moved from one spool to the other, and resilient means urged toward said take-off spool, said means having a curved portion adapted to engage a portion of the film between the gate and the take-up spool to form a bent section therein and urge said portion against film on the take-off spool, and to flex away from the take-off spool in response to tension placed on said bent section of film during operation of the take-up spool.

3. In a motion picture film magazine including a take-off spool, a continuously driven take-up spool and a gate past which the film is intermittently moved from one spool to the other, and resilient means urged toward said take-off spool, said means having a curved portion adapted to engage a portion of the film between the gate and the take-up spool to form a bent section therein and urge said portion against film on the take-off spool and to flex away from the take-off spool in response to tension placed on said bent section of film during operation of the take-up spool, and an element adapted to guide the film in an indirect path from said means to the take-up spool.

4. In a motion picture film magazine, in combination, a take-off spool, a continuously driven shaft, a take-up spool mounted thereon and driven thereby, gate means including a presser plate adapted to yieldingly bear against the film in the gate, said gate means being constructed and arranged to provide openings to permit intermittent mechanism to engage the film, and resilient means mounted on a wall of the magazine and urged toward the take-off spool for engaging a portion of the film between the gate and the take-up spool to form a bent section therein and for urging said portion against the film on the take-off spool between the three and six o'clock positions of the latter.

5. In a motion picture film magazine, in combination, a take-off spool, a continuously driven shaft, a take-up spool mounted thereon and driven thereby, gate means including a presser plate adapted to yieldingly bear against the film in the gate, said gate means being constructed and arranged to provide openings to permit intermittent mechanism to engage the film, resilient means mounted on a wall of the magazine and urged toward the take-off spool for engaging a portion of the film between the gate and the take-up spool to form a bent section therein and for urging said portion against the film on the take-off spool between the three and six o'clock positions of the latter, and a guide element adapted to cause the film to take an indirect path from said resilient means to the take-up spool.

6. In a motion picture film magazine including a take-off spool, a continuously driven take-up spool and a gate past which the film is intermittently moved from one spool to the other, and a resilient member engaging a span of the film between the gate and the take-up spool adjacent the take-off spool to form a bent section therein which is unobstructedly urged toward the take-off spool sufficiently to cause engagement between the span of film and the film on said spool at times.

7. In a motion picture film magazine including a take-off spool, a continuously driven take-up spool and a gate past which the film is intermittently moved from one spool to the other, a guide which in cooperation with the end of guides adjacent the gate provides fixed supports for the ends of a span of film, and a resilient member engaging the span of film between the gate and the take-up spool adjacent the take-off spool to form a bent section therein which is unobstructedly urged toward the take-off spool sufficiently to cause engagement between the span of film and the film on said spool at times.

JULIUS PEARLMAN.
ALBERT KINDELMANN.